United States Patent
Satake et al.

(10) Patent No.: US 10,054,931 B2
(45) Date of Patent: Aug. 21, 2018

(54) NUMERICAL CONTROLLER HAVING MACHINE ABNORMALITY HISTORY ANALYSIS SUPPORT FUNCTION

(71) Applicant: FANUC Corporation, Minamitsuru-gun, Yamanashi (JP)

(72) Inventors: Yoshikazu Satake, Minamitsuru-gun (JP); Hideaki Maeda, Minamitsuru-gun (JP); Kazuo Sato, Minamitsuru (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 411 days.

(21) Appl. No.: 14/808,276

(22) Filed: Jul. 24, 2015

(65) Prior Publication Data

US 2016/0033955 A1 Feb. 4, 2016

(30) Foreign Application Priority Data

Jul. 29, 2014 (JP) ................. 2014-153791

(51) Int. Cl.
*G06F 19/00* (2018.01)
*G05B 19/406* (2006.01)
*G05B 23/02* (2006.01)

(52) U.S. Cl.
CPC ....... *G05B 19/406* (2013.01); *G05B 23/0272* (2013.01); *G05B 2219/34475* (2013.01)

(58) Field of Classification Search
USPC ...................................... 700/174
See application file for complete search history.

(56) References Cited

U.S. PATENT DOCUMENTS

| | | | | |
|---|---|---|---|---|
| 4,725,960 A | * | 2/1988 | Shima | G05B 19/4068 340/4.36 |
| 6,512,961 B1 | | 1/2003 | Fukaya et al. | |
| 2003/0163286 A1 | * | 8/2003 | Yasugi | G05B 19/4065 702/185 |
| 2006/0074514 A1 | * | 4/2006 | Mukai | G05B 19/4069 700/177 |
| 2008/0177403 A1 | | 7/2008 | Masuya et al. | |
| 2009/0030545 A1 | * | 1/2009 | Masuya | B23Q 17/12 700/175 |

(Continued)

FOREIGN PATENT DOCUMENTS

| | | |
|---|---|---|
| JP | 2003-223205 A | 8/2003 |
| JP | 2008/0177403 A1 | 7/2008 |

(Continued)

OTHER PUBLICATIONS

Notification of Reason for Refusal dated Mar. 27, 2018 in Japanese Patent Application No. 2014-153791 (5 pages) with an English translation (6 pages).

*Primary Examiner* — Mohammad Ali
*Assistant Examiner* — Md Azad
(74) *Attorney, Agent, or Firm* — Drinker Biddle & Reath LLP

(57) ABSTRACT

A numerical controller having a machine abnormality history analysis support function includes drawing unit for generating a tool image based on CNC information in which operation state information of a machine tool at the time of detection of an abnormality by an abnormality detection unit is associated with information about the detected abnormality, and arranging and drawing the tool image in a coordinate space.

8 Claims, 6 Drawing Sheets

(56) References Cited

U.S. PATENT DOCUMENTS

| | | | |
|---|---|---|---|
| 2013/0112893 A1* | 5/2013 | Miyake | H01J 37/28 250/442.11 |
| 2014/0123740 A1* | 5/2014 | Yoshikawa | B23Q 17/0961 73/104 |
| 2015/0066212 A1* | 3/2015 | Yahaba | G06F 3/0488 700/275 |
| 2015/0153719 A1* | 6/2015 | Tsuda | G01M 13/00 700/193 |
| 2015/0352679 A1* | 12/2015 | Yamamoto | G05B 19/4061 73/865.8 |

FOREIGN PATENT DOCUMENTS

| | | |
|---|---|---|
| JP | 2009-175793 A | 8/2009 |
| WO | WO-00/10769 A1 | 3/2000 |

* cited by examiner

| | TIME | TOOL OFFSET | MACHINE COORDINATE VALUE | | | IMPACT VALUE | ACTUAL SPEED | ... |
|---|---|---|---|---|---|---|---|---|
| | | | X | Y | Z | | | |
| ... | ... | ... | ... | ... | ... | ... | ... | ... |
| 16 | 2011/10/25 08:06:30 | 20 | 0 | 0 | 0 | 10 | 40 | ... |
| 17 | 2011/10/25 08:28:36 | 20 | 100 | 90 | 150 | 30 | 10 | ... |
| 18 | 2011/10/25 11:25:58 | 10 | 5 | 30 | 17 | 167 | 112 | ... |
| ... | ... | ... | ... | ... | ... | ... | ... | ... |

FIG. 8

MACHINE STATE HISTORY / CNC INFORMATION LIST / CNC INFORMATION DETAILS

O0123 N00000

DETECTION DATE AND TIME 2011/04/01 16:41:35  NON-STORAGE NUMBER 0002!  NUMBER OF DAYS 1/5   NO.100/100

CNC INFORMATION

HISTORY LIST

| NO. | DETECTION DATE AND TIME |
|---|---|
| 016 | 2011/10/25 08:06:30 |
| 017 | 2011/10/25 08:28:36 |
| 018 | 2011/10/25 11:25:58 |
| 019 | 2011/10/25 16:26:24 |
| 020 | 2011/10/25 17:11:39 |
| 021 | 2011/10/26 08:26:42 |
| 022 | 2011/10/26 08:57:44 |
| 023 | 2011/10/26 09:26:47 |
| 024 | 2011/10/26 09:46:49 |
| 025 | 2011/10/26 10:30:52 |
| 026 | 2011/10/26 10:56:55 |
| 027 | 2011/10/26 10:59:24 |
| 028 | 2011/10/26 13:27:00 |
| 029 | 2011/10/26 14:28:28 |
| 030 | 2011/10/26 14:57:06 |
| 031 | 2011/10/27 08:47:41* |

| MACHINE COORDINATE | | ABSOLUTE COORDINATE | |
|---|---|---|---|
| X | 0.000 | X | 0.000 |
| Y | 0.000 | Y | 0.000 |
| Z | 0.000 | Z | 0.000 |

| | | |
|---|---|---|
| FEED SPEED | F | 0mm/min |
| MAIN SHAFT SPEED | S | 0/min |
| PROGRAM | | SAMPLE |
| BLOCK | 0 | |
| MODE | MEM | |
| MODAL | M | S |
| | T | B |

EACH INDIVIDUAL CASE NEEDS TO BE ANALYZED

MEM ** * ***     12:00:00

LIST | CNC DATA | OPERATION HISTORY | (OPERATION)

NUMERICAL CONTROLLER HAVING MACHINE ABNORMALITY HISTORY ANALYSIS SUPPORT FUNCTION

RELATED APPLICATION DATA

This application claims priority under 35 U.S.C. § 119 and/or § 365 to Japanese Application No. 2014-153791 filed Jul. 29, 2014, the entire contents is incorporated herein by reference.

BACKGROUND OF THE INVENTION

1. Field of the Invention

The present invention relates to a numerical controller, and especially to a numerical controller having a machine abnormality history analysis support function.

2. Description of the Related Art

There is the technique in that, in the case where the occurrence of an abnormal load or the like on a spindle of a machine tool controlled by a numerical controller is detected, CNC information of a machine tool spindle coordinate value, an actual speed of the machine tool spindle, a tool offset set by the numerical controller in the machining, a machining program in operation or the like, is stored in a storage device of the numerical controller and utilized (for example, International Patent Application Publication No. 00/10769).

In the case where an abnormality, such as a decrease in machining accuracy for the workpiece, has occurred in the machine tool, the operator who operates the machine tool can analyze the stored CNC information to determine whether or not a problem leading to the decrease in machining accuracy, such as the spindle collision with something, occurred in the past.

If the operator is able to determine the cause of the machine abnormality, such as spindle collision, by analyzing the CNC information, the operator can further specify the cause of the spindle collision, such as an input error of the tool offset or a programming error of the machining program, by checking the tool offset, the machining program, and the like stored at the same time as the spindle collision.

According to this technique, a plurality of sets of CNC information that include not only CNC information relating to problems that occurred recently but also CNC information relating to problems that occurred during the machining of the workpiece can be stored as history records. This enables investigation of whether or not spindle collision or the like occurred, by going back to the past. It is, however, impossible to reliably determine heavy cutting or spindle collision by automatic analysis by machine. Accordingly, CNC information with a high possibility of spindle collision is automatically stored based on conditions set by each machinery manufacturer as illustrated in FIG. 7, and later the operator analyzes the stored CNC information to determine whether or not spindle collision occurred.

With this technique, however, in the case where a problem is assumed to have occurred in the machine tool, CNC information is stored even if the problem is not significant. Hence, large amounts of CNC information are stored in one numerical controller, as illustrated in FIG. 8. In order to extract CNC information about the cause of the machine abnormality, such as spindle collision, from the large amounts of CNC information, the operator needs to analyze each individual set of CNC information. Thus, there is a problem of the investigation taking long time.

SUMMARY OF THE INVENTION

The present invention therefore has an object of providing a numerical controller that enables an operator to identify, at a glance, problematic CNC information from among stored large amounts of CNC information.

A numerical controller having a machine abnormality history analysis support function according to the present invention controls a machine tool having a spindle provided with a tool based on a machining program, and includes: an abnormality detection unit for detecting an abnormality that has occurred during control of the spindle; a data storage unit for storing CNC information in which operation state information of the machine tool including a coordinate value of the spindle at a time of the detection of the abnormality by the abnormality detection unit is associated with information about the detected abnormality; and drawing unit for generating a tool image based on the CNC information, and arranging and drawing the tool image in a coordinate space based on the coordinate value.

The data storage unit may store a plurality of sets of CNC information, and the drawing unit may draw a plurality of tool images generated based on the plurality of sets of CNC information, in the coordinate space.

The numerical controller may further include a highlight condition setting unit for setting a highlight condition relating to an item of the CNC information, and, in the case where the CNC information is determined to satisfy the set highlight condition, the drawing unit may draw the tool image generated based on the CNC information that satisfies the highlight condition, in the coordinate space in highlighted form.

The highlight condition may be at least one of that: (1) an impact value is included despite the spindle having no rotation; (2) a load acts on a feed shaft despite no load acting on the spindle; (3) an actual speed is 0 despite a command speed or a remaining movement amount of the spindle being not 0; and (4) a heavy load acts on the spindle despite fast feed.

The information about the detected abnormality may include an impact value of the spindle detected by the abnormality detection unit, and the drawing unit may change an appearance of the tool image based on the impact value.

The operation state information may include a command speed of the spindle indicated by the machining program and an actual speed of the spindle, and the drawing unit may change an appearance of the tool image based on the command speed and the actual speed.

The operation state information may include a tool offset value of the spindle, and the drawing unit may change an appearance of the tool image based on the tool offset value.

The operation state information may include a movement direction of the spindle, and the drawing unit may change an appearance of the tool image based on the movement direction.

The operation state information may include a position of the tool provided on the spindle, and the drawing unit may change an appearance of the tool image based on the position of the tool.

According to the present invention, a plurality of sets of CNC information are graphically displayed on a screen so that data with a high possibility of spindle collision can be determined at a glance. This shortens the time for the operator to analyze a mechanical abnormality such as spindle collision. For example in the case where the machining accuracy of the machine tool decreases, whether or not spindle collision occurred in the past can be promptly investigated. The present invention is thus useful for machine tool maintenance.

BRIEF DESCRIPTION OF THE DRAWINGS

The above and other objects and features of the present invention will be obvious from the ensuing description of embodiments with reference to the accompanying drawings, in which:

FIG. 8 is a diagram for describing a problem with the conventional technique.

DETAILED DESCRIPTION OF THE PREFERRED EMBODIMENTS

Figure 1:
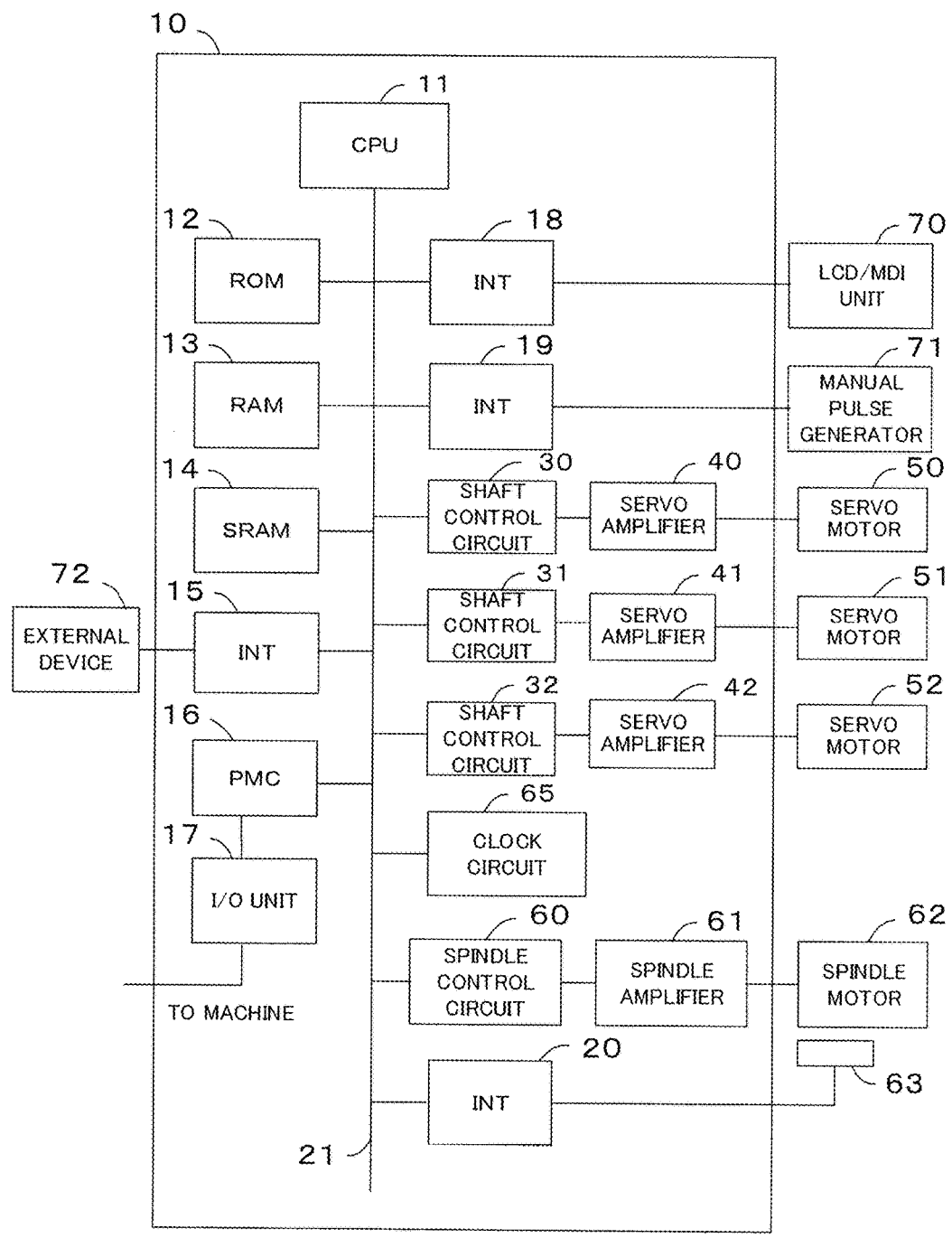
FIG. 1 is a block diagram of a relevant part of a numerical controller in an embodiment of the present invention.

FIG. 1 is a block diagram of a relevant part of a numerical controller in an embodiment of the present invention. In a numerical controller 10, a processor (CPU) 11 is a processor for controlling the whole numerical controller 10. The processor 11 reads a system program stored in a ROM 12 through a bus 21, and controls the whole numerical controller 10 according to the system program. A RAM 13 stores temporary calculation data and display data, various data input by an operator through an LCD/MDI a liquid crystal display/manual data input (LDC/MDI) unit 70, and the like.

An SRAM 14 is nonvolatile memory which is backed up by a battery (not illustrated) and retains stored information even when the numerical controller 10 is powered off. The SRAM 14 is used to store the below-mentioned machining program read through an interface 15, machining program input through the LCD/MDI unit 70, and the like. The ROM 12 stores beforehand various system programs for performing processes in edit mode necessary to create and edit a machining program and a graphical display program needed for display of CNC information, and processes for automatic operation.

The interface 15 is an interface for an external device connectable to the numerical controller 10, and an external device 72 such as an external storage device is connected to the interface 15. A machining program and the like are read from the external storage device. A programmable machine controller (PMC) 16 controls an auxiliary device and the like on the machine tool side by a sequence program included in the numerical controller 10. In detail, the PMC 16 converts a signal necessary in the auxiliary device by the sequence program according to an M function, S function, and T function indicated by a machining program, and outputs the signal to the auxiliary device from an I/O unit 17. The output signal serves to operate the auxiliary device such as each actuator and the like.

Moreover, a signal of any switch or the like of an operation panel disposed in the body of the machine tool is received, subjected to necessary processing, and then passed to the processor 11.

An image signal such as the current position, alarm, parameter, and image data of each shaft of the machine tool is sent to the LCD/MDI unit 70 and displayed on its display. The LCD/MDI unit 70 is a manual data input device including a display, a keyboard, and the like. An interface 18 receives data from the keyboard of the LCD/MDI unit 70, and passes the data to the processor 11.

An interface 19 is connected to a manual pulse generator 71. The manual pulse, generator 71 is implemented in the operation panel of the machine tool, and used to accurately position the movable part of the machine tool in each axis control by a distributed pulse based on manual operation.

Shaft control circuits 30 to 32 of X, Y, and Z shafts for moving the table of the machine tool receive movement commands for the respective shafts from the processor 11, and output the commands for the respective shafts to servo amplifiers 40 to 42. The servo amplifiers 40 to 42 receive the commands, and drive servo motors 50 to 52 of the respective shafts of the machine tool. The servo motors 50 to 52 of the respective shafts each include a pulse coder for position detection, and a position signal from the pulse coder is fed back as a pulse string.

A spindle control circuit 60 receives a spindle rotation command to the machine tool, and outputs a spindle speed signal to a spindle amplifier 61. The spindle amplifier 61 receives the spindle speed signal, and rotates a spindle motor 62 of the machine tool at the command rotation speed to drive the tool.

The spindle motor 62 is coupled with a position coder 63 by a gear, a belt, or the like. The position coder 63 outputs a feedback pulse synchronously with the rotation of the spindle, and the feedback pulse is read by the processor 11 through an interface 20. A clock circuit 65 has been adjusted to be synchronous with the current time.

The machine tool has various sensors (not illustrated) for state detection, such as a position sensor, a speed sensor, and an impact sensor, which are equipped in the spindle motor as an example. Detection signals from these sensors are read by the processor 11 through an interface (not illustrated).

Figures 2, 3:
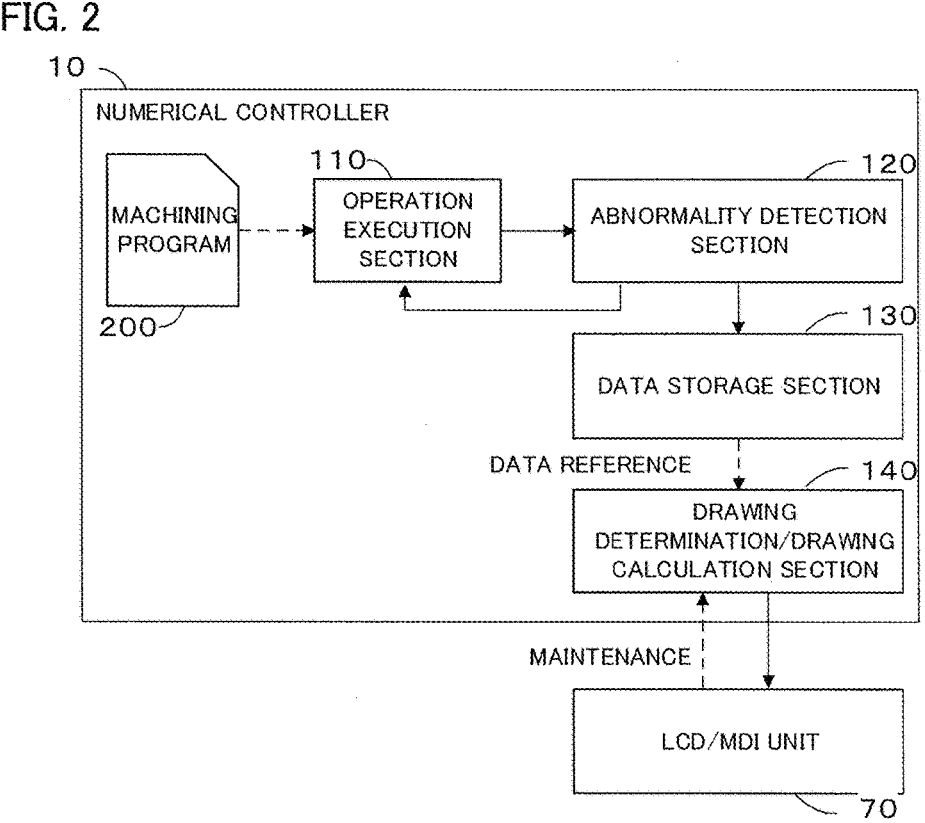
FIG. 2 is a functional block diagram of the numerical controller in the embodiment of the present invention.
FIG. 3 is a diagram for describing a CNC information database in the embodiment of the present invention.

FIG. 2 is a functional block diagram of the numerical controller 10 in the embodiment of the present invention. The numerical controller 10 includes an operation execution section 110, an abnormality detection section 120, a data storage section 130, and a drawing determination/drawing calculation section 140.

The operation execution section 110 outputs commands to the shaft control circuits, the spindle control circuit, and the like based on, for example, program commands of a machining program 200 read from the SRAM 14 or the like and commands of the system program, to control the operation of the machine tool. The operation execution section 110 also outputs various parameters such as the command speed of the spindle used in the operation control and the set tool offset, to the abnormality detection section 120.

The abnormality detection section 120 analyzes signals detected by the sensors equipped in the machine tool. Each time the abnormality detection section 120 determines that an abnormality occurrence condition for the machine tool set, for example, in the SRAM 14 of the numerical controller 10 beforehand is satisfied, the abnormality detection section 120 stores CNC information such as the tool offset, the machine coordinate value, the position of the rotation shaft, the remaining movement amount, the command speed, the actual speed, and the impact value in the data storage section 130 in association with the current time, based on the parameters acquired from the operation execution section 110 and the signals output from the sensors equipped in the machine tool.

The data storage section 130 is a storage area provided on memory such as the SRAM 14, and includes a CNC information database. FIG. 3 is a diagram illustrating an example of the CNC information database. FIG. 3 illustrates part of the items of the CNC information database. Regarding which items are included in the CNC information database, however, necessary items may be set so as to enable the below-mentioned drawing process based on the type and property of the machine tool to be controlled, the installation environment of the machine tool, and so on.

The drawing determination/drawing calculation section 140, when the operator operates the LCD/MDI unit 70 to issue a CNC information drawing command to the numerical controller 10 during maintenance work, reads the CNC information stored in the data storage section 130, generates a plurality of tool images based on the respective sets of CNC information, and draws an image obtained by arranging each generated tool image in a three-dimensional coordinate space system, on the screen of the LCD/MDI unit 70.

The following describes an overview of the drawing process executed by the drawing determination/drawing calculation section 140 in this embodiment.

Figure 4:
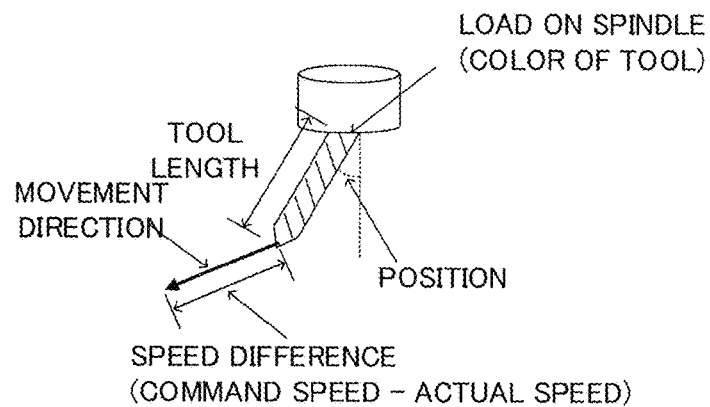
FIG. 4 is a diagram illustrating an example of a tool image in the embodiment of the present invention.

FIG. 4 is a diagram illustrating an example of a tool image based on CNC information, which is generated by the drawing determination/drawing calculation section 140. In this embodiment, from the shape and appearance of the tool image, the operator can intuitively recognize the operation state of the machine tool and the state of the spindle at the time of recording the CNC information, i.e. at the time of the occurrence of the phenomenon. In this embodiment, the tool image is mainly expressed as a schematic view of the tip of the spindle and the tool attached to the tip of the spindle, as illustrated in FIG. 4. In the tool image in FIG. 4, the color of the tool represents the load on the spindle. For example, the tool is displayed in red color in the case where the load detected at the time of the occurrence of the phenomenon has a large value. The tilt of the tool represents the position of the tool, allowing the operator to recognize in which direction the tool faced at the time of the occurrence of the phenomenon. The length of the tool represents the tool length (tool offset value), allowing the operator to recognize whether or not a correct tool offset value was set. The magnitude of the vector displayed from the tool is based on the difference between the command speed and the actual speed at the time of the occurrence of the phenomenon, allowing the operator to recognize the amount by which the tool was unable to be moved with respect to the command amount due to impact or the like. The direction of the vector displayed from the tool is based on the remaining movement amount at the time of the occurrence of the phenomenon, allowing the operator to recognize the movement direction of the tool.

Figure 5:
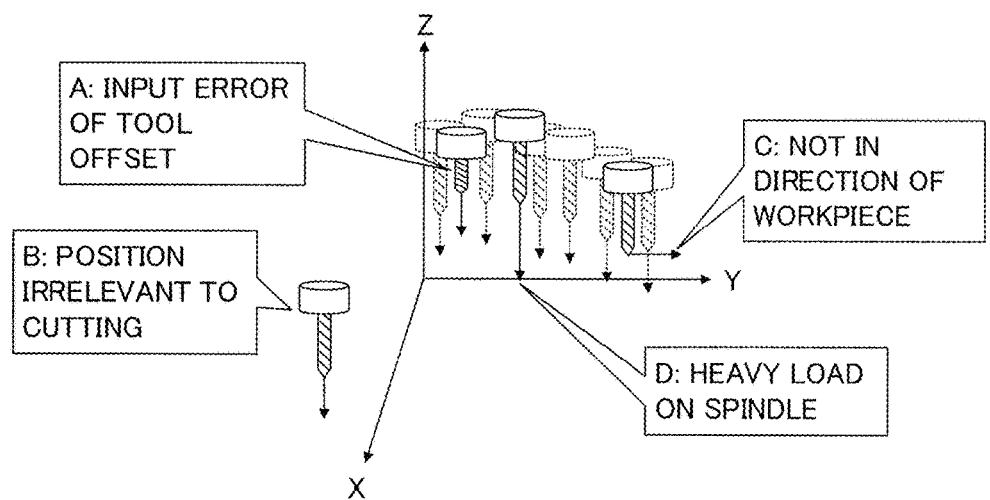
FIG. 5 is a diagram illustrating a display example of CNC information in the embodiment of the present invention.

FIG. 5 is a diagram illustrating an example of drawing a plurality of tool images generated based on CNC information and arranged in the three-dimensional coordinate space system, on the screen of the LCD/MDI unit 70. As illustrated in FIG. 5, the position of the tool displayed in the coordinate space is determined based on the coordinate value at the time of the occurrence of the phenomenon, from which the operator can determine whether or not the tool was at an incorrect position.

Moreover, a predetermined condition is set with regard to CNC information. Any CNC information that satisfies the condition is assumed to be not related to normal shaft movement, and the tool image based on such CNC information is displayed in front of the other tool images in highlighted form. The predetermined condition may be set beforehand in the SRAM 14 or the like, or input by the operator through the LCD/MDI unit when using the drawing determination/drawing calculation section 140 during maintenance work. When highlighting the tool image that requires attention, any display method, such as displaying the tool image in front, changing the size of the tool image, displaying each tool image based on other CNC information not satisfying the condition in light gray color so as not to be noticeable, is applicable as long as the tool image based on the CNC information satisfying the predetermined condition can be displayed to be noticeable by the operator.

In the example in FIG. 5, four tool images are highlighted in front of the other tool images, while the other tool images are in light color so as not to be noticeable. From this, it can be easily understood that the four tool images require attention. The following can be recognized at a glance from the respective four images: A. from a short tool length, an input error of the tool offset occurred at the time of the occurrence of the phenomenon; B. from the position of the tool image, the tool moved to a position irrelevant to cutting at the time of the occurrence of the phenomenon; C. from the direction of the vector at the tip of the tool, the tool did not move in the direction of the workpiece at the time of the occurrence of the phenomenon; and D. from the length of the vector at the tip of the tool and the color of the tool, a heavy load acted on the spindle at the time of the occurrence of the phenomenon.

Figure 6:
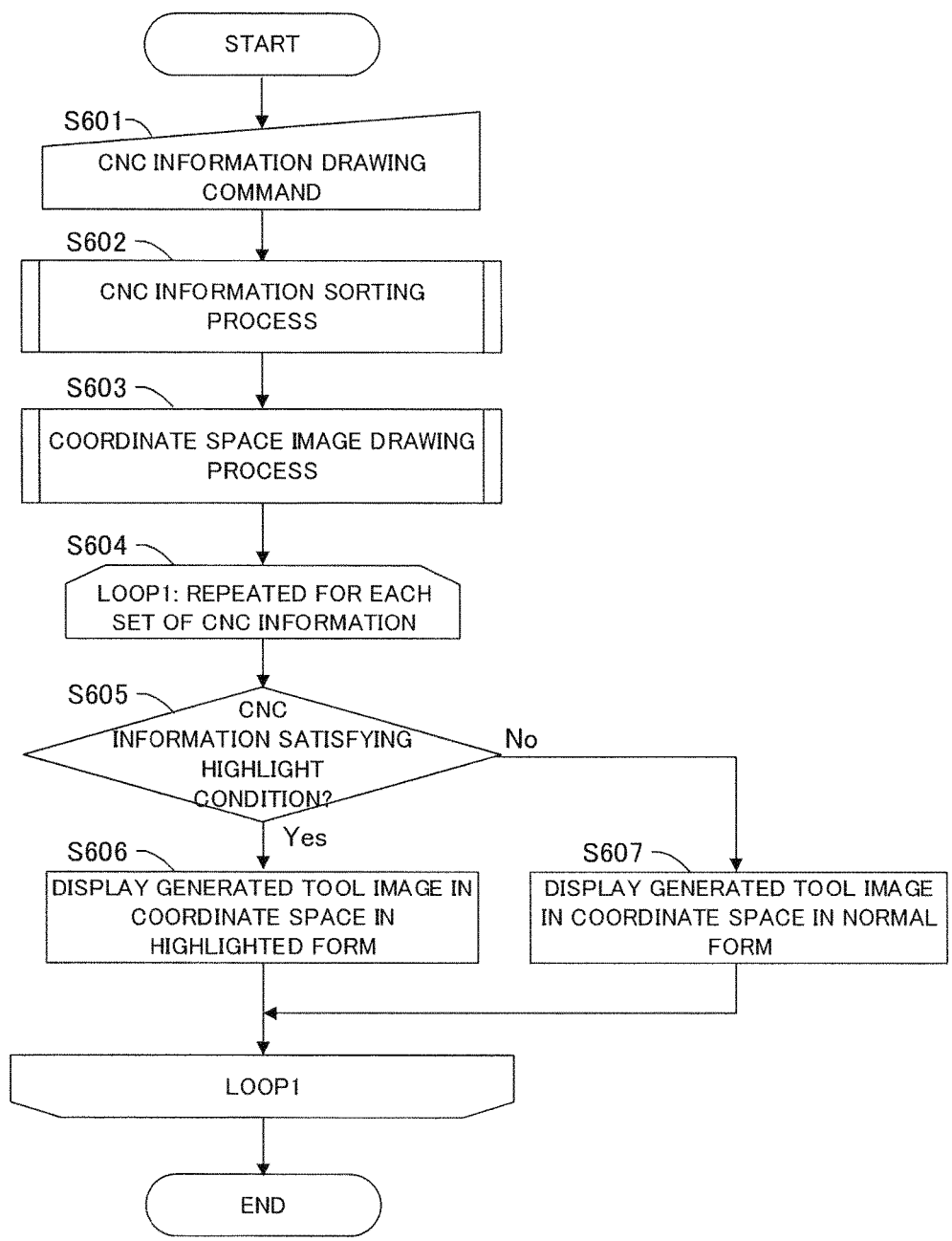
FIG. 6 is a flowchart of a tool image drawing process in the embodiment of the present invention.
Figure 7:
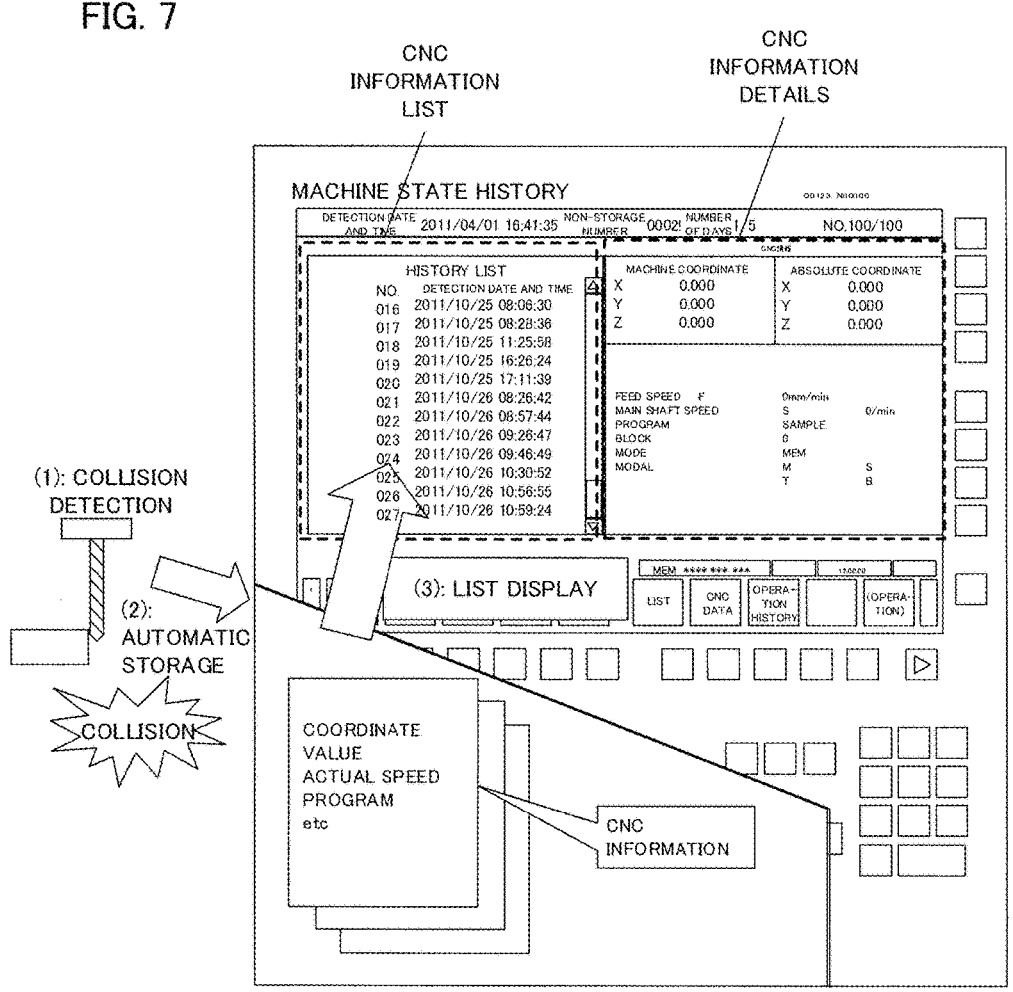
FIG. 7 is a diagram schematically illustrating a CNC information storage function in a conventional technique.

FIG. 6 is a flowchart of the drawing process executed by the drawing determination/drawing calculation section 140 in this embodiment.

[S601] The operator operates the LCD/MDI unit 70 to issue a CNC information drawing command to the numerical controller 10 together with a CNC information sorting condition. Examples of the sorting condition that can be indicated include the date of occurrence, the movement direction of the tool, and the impact value.

[S602] A plurality of sets of CNC information recorded in the CNC information database in the data storage section 130 as a result of abnormality detection by the abnormality detection section 120 are sorted (rearranged) based on the sorting condition indicated in step S601.

[S603] A coordinate space image is drawn on the screen of the LCD/MDI unit 70.

[S604] The plurality of sets of CNC information stored in the CNC information database are read in sequence, and the process of steps S605 to S607 is repeatedly executed for all sets of CNC information.

[S605] Whether or not the read CNC information satisfies a condition for highlight display is determined. In the case where the CNC information satisfies the condition for highlight display, the process advances to step S606. In the case where the CNC information does not satisfy the condition for highlight display, the process advances to step S607. Examples of the condition for highlight display include: (1) an impact value is included despite the spindle having no rotation; (2) a load acts on a feed shaft despite no load acting on the spindle; (3) the actual speed is 0 despite the command speed or remaining movement amount of the spindle being not 0; and (4) a heavy load acts on the spindle despite fast feed. Other conditions may be set as appropriate depending on, for example, the type or property of the machine tool to be controlled.

[S606] A tool image is generated based on the read CNC information, and displayed in highlighted form in the coordinate space image drawn on the LCD/MDI unit 70.

[S607] A tool image is generated based on the read CNC information, and displayed in normal form in the coordinate space image drawn on the LCD/MDI unit 70.

Though the above describes an embodiment of the present invention, the present invention is not limited to the foregoing embodiment, and may be carried out in other aspects by adding appropriate changes. For example, though the foregoing embodiment describes an example of implementing the drawing determination/drawing calculation section 140 in the numerical controller 10, the drawing determination/drawing calculation section 140 may be implemented in a computer other than the numerical controller 10 so that the CNC information database recorded in the numerical controller 10 is externally read and displayed on the screen of the computer.

The invention claimed is:

1. A numerical controller having a machine abnormality history analysis support function, for controlling a machine tool having a spindle provided with a tool based on a machining program, the numerical controller comprising a processor, the processor configured to:
   detect an abnormality that has occurred during control of the spindle;
   store CNC information as data in which operation state information of the machine tool including a coordinate value of the spindle at a time of the detection of the abnormality is associated with information about the detected abnormality;
   generate a tool image based on the CNC information, and arrange and draw the tool image in a coordinate space based on the coordinate value, wherein the tool image depicts the CNC information including the operation state information of the machine tool at the time of the detection of the abnormality; and
   set a highlight condition relating to an item of the CNC information, wherein, in the case where the CNC information is determined to satisfy the set highlight condition, the processor is configured to draw the tool image generated based on the CNC information that satisfies the highlight condition, in the coordinate space in highlighted form.

2. The numerical controller having a machine abnormality history analysis support function according to claim 1, wherein the processor is configured to store a plurality of sets of CNC information, and
   draw a plurality of tool images generated based on the plurality of sets of CNC information, in the coordinate space.

3. The numerical controller having a machine abnormality history analysis support function according to claim 1, wherein the highlight condition is at least one of that:
   an impact value is included despite the spindle having no rotation;
   a load acts on a feed shaft despite no load acting on the spindle;
   an actual speed is 0 despite a command speed or a remaining movement amount of the spindle being not 0; and
   a heavy load acts on the spindle despite fast feed.

4. The numerical controller having a machine abnormality history analysis support function according to claim 1, wherein the information about the detected abnormality includes an impact value of the spindle detected by the processor, and
   wherein the processor is configured to change an appearance of the tool image based on the impact value.

5. The numerical controller having a machine abnormality history analysis support function according to claim 1, wherein the operation state information includes a command speed of the spindle indicated by the machining program and an actual speed of the spindle, and
   wherein the processor is configured to change an appearance of the tool image based on the command speed and the actual speed.

6. The numerical controller having a machine abnormality history analysis support function according to claim 1, wherein the operation state information includes a tool offset value of the spindle, and
   wherein the processor is configured to change an appearance of the tool image based on the tool offset value.

7. The numerical controller having a machine abnormality history analysis support function according to claim 1, wherein the operation state information includes a movement direction of the spindle, and
   wherein the processor is configured to change an appearance of the tool image based on the movement direction.

8. The numerical controller having a machine abnormality history analysis support function according to claim 1, wherein the operation state information includes a position of the tool provided on the spindle, and
   wherein the processor is configured to change an appearance of the tool image based on the position of the tool.

* * * * *